United States Patent
Cerny (10) Patent No.: US 9,534,538 B1
(45) Date of Patent: Jan. 3, 2017

(54) SYSTEMS AND METHODS FOR INTEGRATED POWER AND THERMAL MANAGEMENT IN A TURBINE-POWERED AIRCRAFT

(71) Applicant: General Electric Company, Schenectady, NY (US)

(72) Inventor: Matthew Robert Cerny, West Chester, OH (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 14/923,731

(22) Filed: Oct. 27, 2015

(51) Int. Cl.
| | |
|---|---|
| *B64D 13/06* | (2006.01) |
| *F02C 7/143* | (2006.01) |
| *F02C 9/18* | (2006.01) |
| *F02C 7/36* | (2006.01) |
| *F02C 7/268* | (2006.01) |
| *F02C 7/32* | (2006.01) |
| *H02K 7/18* | (2006.01) |

(52) U.S. Cl.
CPC .............. *F02C 7/143* (2013.01); *F02C 7/268* (2013.01); *F02C 7/32* (2013.01); *F02C 7/36* (2013.01); *F02C 9/18* (2013.01); *H02K 7/1823* (2013.01)

(58) Field of Classification Search
CPC ..................................................... B64D 13/00
USPC ......................................................... 60/39.15
See application file for complete search history.

(56) References Cited

U.S. PATENT DOCUMENTS

| | | | |
|---|---|---|---|
| 932,056 A | 8/1909 | Perkins | |
| 4,684,081 A | 8/1987 | Cronin | |
| 5,086,622 A | 2/1992 | Warner | |
| 5,511,374 A * | 4/1996 | Glickstein | F02C 6/08 60/39.183 |
| 5,813,630 A | 9/1998 | Williams | |
| 5,921,093 A | 7/1999 | Jonqueres | |
| 6,018,941 A | 2/2000 | Massey | |
| 6,148,622 A | 11/2000 | Sanger | |
| 6,283,410 B1 | 9/2001 | Thompson | |
| 6,415,595 B1 * | 7/2002 | Wilmot, Jr. | B64D 13/006 60/266 |
| 7,171,819 B2 * | 2/2007 | Lui | B64D 13/06 454/71 |
| 7,260,926 B2 * | 8/2007 | Sabatino | B64D 37/34 60/206 |
| 7,481,062 B2 | 1/2009 | Gaines et al. | |
| 7,607,318 B2 | 10/2009 | Lui et al. | |
| 7,624,592 B2 | 12/2009 | Lui et al. | |

(Continued)

FOREIGN PATENT DOCUMENTS

EP 2204319 A2 * 7/2010 ............. B64D 13/00

*Primary Examiner* — Joseph Waks
(74) *Attorney, Agent, or Firm* — General Electric Company; Pamela A. Kachur (57) ABSTRACT

An integrated power and thermal management system for a turbine-powered aircraft is provided. The system may comprise a power turbine, compressor, first cooling turbine, second cooling turbine, and electrical motor-generator disposed on a primary shaft. The compressor may be disposed on the primary shaft to motivate a system airflow and operably joined to the power turbine. The first cooling turbine may be rotatably disposed on the primary shaft in selective fluid communication with the compressor. The second cooling turbine may be rotatably disposed on the primary shaft in selective fluid communication with the first cooling turbine.

20 Claims, 3 Drawing Sheets

(56) References Cited

U.S. PATENT DOCUMENTS 8,522,572 B2 * 9/2013 Coffinberry ............ B64D 13/06
                                                                                          165/235

* cited by examiner

SYSTEMS AND METHODS FOR INTEGRATED POWER AND THERMAL MANAGEMENT IN A TURBINE-POWERED AIRCRAFT

FEDERALLY SPONSORED RESEARCH

This invention was made with government support under contract number N00014-10-D-0010 of the Department of the Navy. The government may have certain rights in the invention.

FIELD OF THE INVENTION

The present subject matter relates generally to an aircraft cooling system. More particularly, the present subject matter relates to a system for selectively providing cooling and power management.

BACKGROUND OF THE INVENTION

Typical existing aircrafts are equipped with one or more environmental control systems, including an air-conditioning system to control the aircraft cabin temperature. These systems are also relied upon to provide adequate cabin pressure during flight. Existing systems utilize a portion of air bled from a turbine engine to induce an air flow and power the air-conditioning system. However, since the systems operate solely on air from the turbine engine, such systems are often unable to provide adequate cooling or cabin pressure control during instances when the turbine engine is not operating. For instance, auxiliary cooling systems may be required to cool an aircraft before takeoff. Such auxiliary cooling systems often require substantial power to operate. Lengthy delays before a flight may quickly drain an aircraft's battery, requiring judicious use of the aircraft's many electrical systems. If enough power is used to operate the air-conditioning systems, the aircraft may not have adequate power to start or initiate operation of the aircraft's engine(s). Although additional batteries may be provided, the weight increase of such batteries can be detrimental to the aircraft's efficiency during flight.

In addition, since typical air-conditioning systems rely on air diverted from the engine, the engine may be unable to provide maximum thrust or power while the air-conditioning systems are in operation. Moreover, loss of engine power during flight may result in the loss of cabin pressurization, and potentially, the loss of any electricity to operate the aircraft.

Therefore, there is a need for an aircraft thermal management system that is able to selectively operate independently of the aircraft engine. Moreover, there is a need for a thermal management system that can provide additional power to the aircraft and turbine engine. In addition, there is a need for a power and thermal management system that is able to effectively operate without impeding the power output of the aircraft engine.

Accordingly, improved thermal and power management systems are desired in the art.

BRIEF DESCRIPTION OF THE INVENTION

Aspects and advantages of the invention will be set forth in part in the following description, or may be obvious from the description, or may be learned through practice of the invention.

In accordance with one embodiment of the present disclosure, an integrated power and thermal management system for a turbine-powered aircraft is provided. The integrated power and thermal management system may include a power turbine rotatably disposed on a primary shaft, and a compressor rotatably disposed on the primary shaft to motivate a system airflow. The compressor may be operably joined to the power turbine. The system may include a first cooling turbine rotatably disposed on the primary shaft in selective fluid communication with the compressor, as well as a second cooling turbine rotatably disposed on the primary shaft in selective fluid communication with the first cooling turbine. An electrical motor-generator may be disposed on the primary shaft to alternatively supply a motive force input to the primary shaft and an electrical power output to the aircraft.

In accordance with another embodiment of the present disclosure, an integrated power and thermal management system for a turbine-powered aircraft is provided. The integrated power and thermal management system may include a power turbine rotatably disposed on a primary shaft and a compressor rotatably disposed on the primary shaft to motivate a system airflow. The compressor may be operably joined to the power turbine. The system may include a first cooling turbine rotatably disposed on the primary shaft in selective fluid communication with the compressor, as well as a second cooling turbine rotatably disposed on the primary shaft in selective fluid communication with the first cooling turbine. An electrical motor-generator may be disposed on the primary shaft to alternatively supply a motive force input to the primary shaft and an electrical power output to the aircraft. Moreover, a controller may be in operable communication with the electrical motor-generator and configured to control the system according to one or more predefined modes.

In accordance with yet another embodiment of the present disclosure, a method for operating an integrated power and thermal management system for a turbine-powered aircraft is provided. The method may include initiating an operational mode for the system. The method may also include motivating collective rotation of a power turbine, a compressor, a first cooling turbine, a second cooling turbine, and a motor-generator about a primary shaft, according to the predefined operational mode. Furthermore, the method may provide for directing a first airflow through the compressor, and directing a second airflow through the power turbine.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first," "second," and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows.

Figure 1:
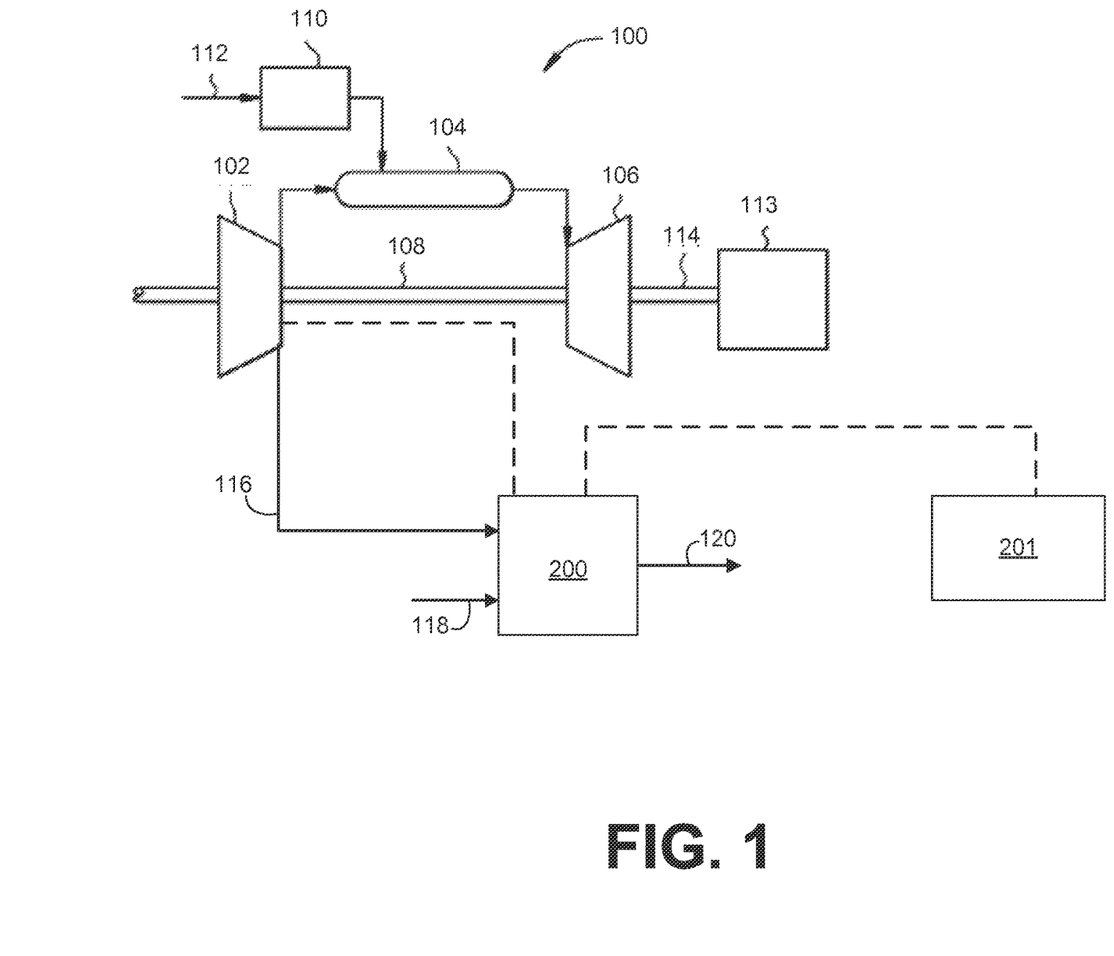
FIG. 1 provides a schematic view of a turbine-powered aircraft engine and integrated thermal and power management system according to one exemplary embodiment of the present disclosure.

Turning now to the figures, FIG. 1 illustrates a schematic diagram of an embodiment of a turbomachine system, such as a gas turbine engine 100 of an aircraft. The engine 100 includes a compressor 102, a combustor 104, a turbine 106, an engine shaft 108 and a fuel nozzle 110. In an exemplary embodiment, the system 100 may include a one or more of compressor 102, combustor 104, turbine 106, engine shaft 108 and fuel nozzle 110. The compressor 102 and turbine 106 are coupled by the engine shaft 108. The engine shaft 108 may be a single shaft or a plurality of shaft segments coupled together to form engine shaft 108.

In some embodiments, the combustor 104 uses liquid and/or gas fuel, such as jet fuel, natural gas or a hydrogen rich synthetic gas, to run the engine 100. In the exemplary embodiment of FIG. 1, fuel nozzles 110 are in fluid communication with a fuel supply 112. The fuel nozzles 110 create an air-fuel mixture, and discharge the air-fuel mixture into the combustor 104, thereby fueling a continuing combustion that creates a hot pressurized exhaust gas. The combustor 102 directs the hot pressurized exhaust gas through a transition piece into a turbine nozzle (or "stage one nozzle"), causing turbine 106 rotation. The rotation of turbine 106 causes the engine shaft 108 to rotate, thereby compressing the air as it flows into the compressor 102. Further, a load 113 is coupled to the turbine 106 via a drive shaft 114. The rotation of turbine 106 thereby transfers a rotational output through the drive shaft 114 to drive the load 113.

As shown, the compressor 102 is in selective fluid communication with an integrated power and thermal management system (IPTMS) 200. A bleed line 116 permits the passage of airflow from the compressor 102 to the IPTMS 200. An ambient air conduit 118 may also be provided to selectively direct a supplementary or alternative airflow to the IPTMS 200. During use, at least a portion of the air compressed in the engine 100 may be selectively directed to the bleed line 116 before passing to the IPTMS 200. Additionally or alternatively, an ambient airflow may be selectively directed through the conduit 118 and pass to the IPTMS 200. After passing through the IPTMS 200, the airflow may be directed through an outlet conduit 120 to the aircraft cabin, bay, or ambient environment. The IPTMS 200 may be configured for operative electrical communication with the engine 100. As will be described below, communication between the engine 100 and IPTMS 200, as well as general operation of the IPTMS 200 and its various components, may be controlled by the controller 201.

The controller 201 may include a discrete processor and memory unit (not pictured). The processor may include a digital signal processor (DSP), an application specific integrated circuit (ASIC), a field programmable gate array (FPGA) or other programmable logic device, discrete gate or transistor logic, discrete hardware components, or any combination thereof designed and programmed to perform or cause the performance of the functions described herein. The processor may also include a microprocessor, or a combination of the aforementioned devices (e.g., a combination of a DSP and a microprocessor, a plurality of microprocessors, one or more microprocessors in conjunction with a DSP core, or any other such configuration).

Additionally, the memory device(s) may generally comprise memory element(s) including, but not limited to, computer readable medium (e.g., random access memory (RAM)), computer readable non-volatile medium (e.g., a flash memory), a compact disc-read only memory (CD-ROM), a magneto-optical disk (MOD), a digital versatile disc (DVD), and/or other suitable memory elements. The memory can store information accessible by processor(s), including instructions that can be executed by processor(s). For example, the instructions can be software or any set of instructions that when executed by the processor(s), cause the processor(s) to perform operations. For the embodiment depicted, the instructions include a software package configured to operate the system 200 to, e.g., execute the exemplary methods 300 described below with reference to FIG. 3.

Figure 2:
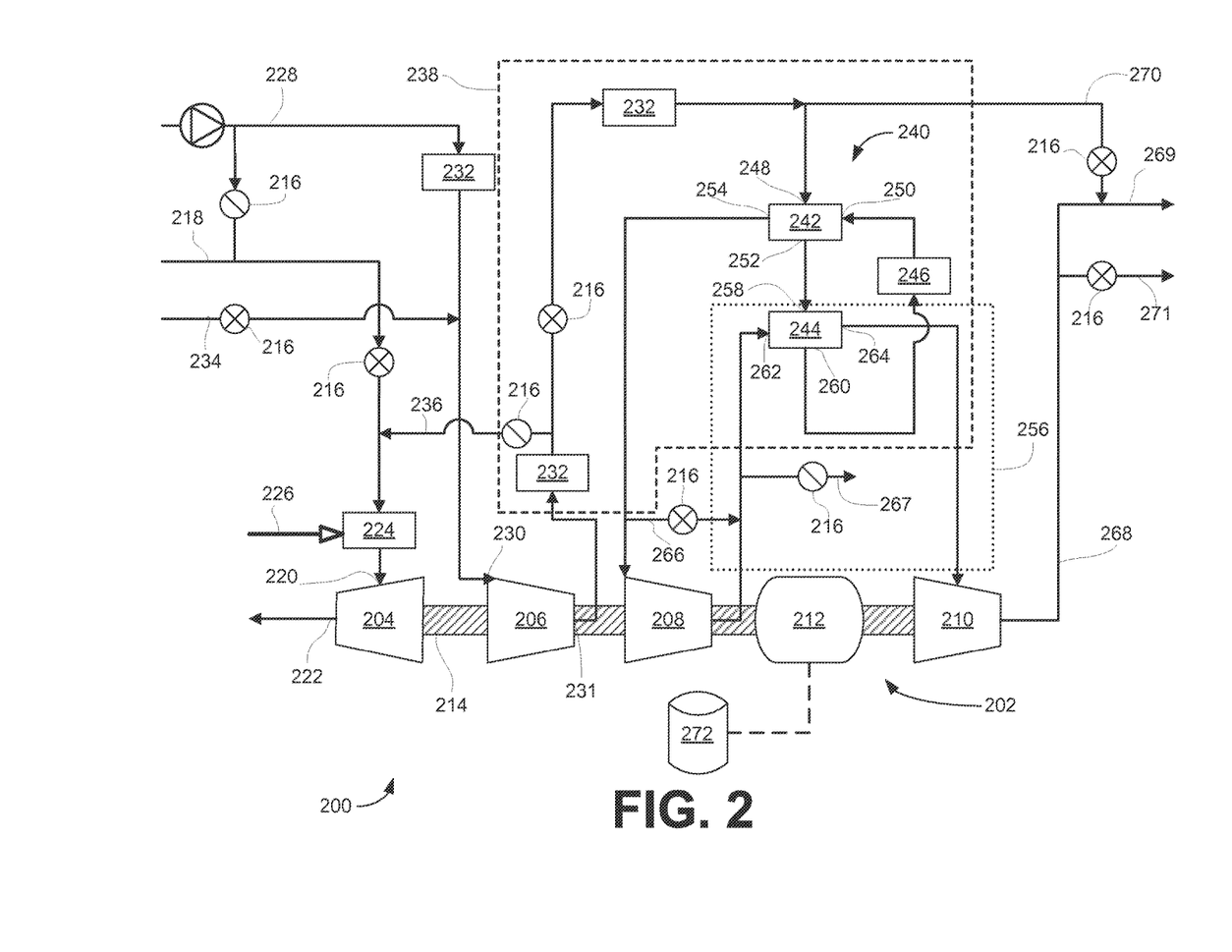
FIG. 2 provides an exemplary embodiment of an integrated power and thermal management system according to the present disclosure.

Turning now to FIG. 2, an exemplary embodiment of an IPTMS 200 is illustrated. As shown, the IPTMS 200 of some embodiments includes an auxiliary power unit (APU) 202. The APU 202 may include a power turbine 204, a compressor 206, a first cooling turbine 208, a second cooling turbine 210, and an electrical motor-generator 212, each being disposed on a primary shaft 214. Each of the power turbine 204, compressor 206, first cooling turbine 208, second cooling turbine 210, and electrical motor-generator 212 may be rotationally fixed to the primary shaft 214. As a result, rotation of primary shaft 214 (or of any rotational APU item, individually) may cause collective and simultaneous rotation of the other items. Multiple fluid conduits and selectively-closable valves 216 may be provided to direct air to, from, or through one or more portion of the APU 202, as will be described below.

As noted above, the power turbine 204 of certain embodiments is rotatably disposed on the primary shaft 214. The primary shaft 214 may be configured to generate or provide a rotational power the APU 202. Optionally, rotation of the power turbine may be induced by an airflow provided from one or more of engine 100, compressor 206, or ambient environment. As illustrated, a first or high-pressure engine bleed line 218 may be connected to an inlet 220 of the power turbine 204. The high-pressure engine bleed line 218, itself may include all or a portion of the aforementioned bleed line 116. In additional or alternative embodiments, the high-pressure engine bleed line 218 may be in selective fluid communication with the ambient air line 118. One or more valve 216 may be provided to limit or control the airflow through the high-pressure engine bleed line 218. An outlet 222 of the power turbine 204 directs air from the inlet 220 to the ambient environment. Airflow between the inlet 220 and outlet 222 may, thereby, induce rotation of the power turbine 204.

In additional or alternative embodiments, the burner 224 may be provided in fluid communication with the power turbine 204 and selective communication with the high-pressure engine bleed line 218. The burner 224 may be positioned upstream of the power turbine 204 to selectively direct a combustion airflow thereto. During operation, the burner 224 may be ignited, combusting a fuel and airflow to create a combustion airflow. The combustion airflow may serve to motivate rotation of the power turbine 204, and thereby, the primary shaft 214. A discrete fuel line 226 may feed fuel to the burner 224 from a fuel supply. In some embodiments, the burner will share the engine's own fuel supply 112. In other embodiments, a discrete fuel supply for the burner 224 is provided.

The compressor 206 is operably joined to the power turbine 204 and rotatably positioned to motivate an airflow through the IPTMS 200. One or more lines may be joined to the compressor 206 in fluid communication to direct air thereto. For instance, some embodiments include a second or intermediate-pressure engine bleed line 228 directing air into the compressor inlet 230. At least one heat exchanger 232 may be positioned within the intermediate-pressure engine bleed line 228 to cool the exhaust air being supplied from the engine 100 to the compressor 206. In additional or alternative embodiments, an ambient air line 234 is provided in fluid communication with the compressor 206 to supply ambient air to the IPTMS 200. The intermediate-pressure engine bleed line 228 may include all or a portion of the aforementioned bleed line 116, while the ambient air line 234 may include all or a portion of the ambient air conduit 118.

During use, the compressor 206 substantially compresses air flowing therethrough before directing at least a portion of the compressed air from an outlet 231 of the compressor 206 and to one or more downstream heat exchangers 232. As illustrated, a first bypass line 236 may be provided downstream from the compressor 206 to selectively direct air to the power turbine 204. The air exiting the first bypass line 236 may flow from a position upstream of the power turbine 204 and burner 224. Optionally, a compressed airflow will be directed from the compressor 206 and to the burner 224 through the first bypass line 236, as will be described below.

Air flowing from the compressor 206 that does not pass into the first bypass line 236 may be motivated into a first cooling circuit 238. Along with one or more heat exchangers 232, the first cooling circuit 238 may include a reheater loop 240 that provides additional cooling and treatment for the system airflow. Air entering the reheater loop 240 may pass sequentially through a reheater or reheater unit 242, condenser 244, and water separator 246. The reheater 242 facilitates an indirect heat exchange that initially cools the air entering the reheater loop 240. The condenser 244 substantially condenses moisture within the airflow; the water separator 246 extracts the condensed moisture such that air exiting the separator is substantially dry and free of moisture.

In optional embodiments, the reheater 242 includes multiple discrete inlets 248, 250 and outlets 252, 254. For instance, certain reheater 242 embodiments include an upstream inlet 248 and a discrete downstream inlet 250, as well as an upstream outlet 252 and a discrete downstream outlet 254. Air may enter the reheater 242 initially at the upstream inlet 248 before exiting at the upstream outlet 252. The upstream outlet 252 is positioned in fluid flow before the downstream inlet 250. As a result, air exiting the upstream outlet 252 is directed into the downstream inlet 250 before again exiting the reheater 242 at the downstream outlet 254.

Air passing between the upstream inlet 248 and upstream outlet 252 is cooled by the isolated cross-flowing air passing between the downstream inlet 250 and downstream outlet 254. By contrast, air passing between the downstream inlet 250 and downstream outlet 254 is reheated indirectly by the upstream flow path before passing out of the reheater loop 240.

After exiting the reheater loop 240, air may be directed to the first cooling turbine 208 and/or second cooling circuit 256. In some embodiments, air passing through the first cooling turbine 208 may expand before entering the second cooling circuit 256. In additional or alternative embodiments, a second bypass line 266 may be provided to selectively direct air around the first cooling turbine 208 and into the second cooling circuit 256. In further additional or alternative embodiments, an ambient regulator line 267 may be provided to selectively direct a portion of the airflow from the first cooling turbine 208 to the ambient environment.

The second cooling circuit 256 may include one or more line in fluid communication between the first cooling turbine 208 and second cooling turbine 210. Optional embodiments may also include one or more portion of the first cooling circuit 238. For instance, an exemplary embodiment of the first cooling circuit 238 and second cooling circuit 256 includes the condenser 244 of the reheater loop 240. The condenser 244 of such embodiments includes multiple discrete inlets 258, 262 and outlets 260, 264. A first-pass inlet 258 and a first-pass outlet 260 are positioned in fluid communication between the upstream outlet 252 and downstream inlet 250 of the reheater unit 242. A second-pass inlet 262 and second-pass outlet 264 of the condenser 244 are in fluid communication between the first cooling turbine 208 and the second cooling turbine 210.

The second cooling turbine 210 may be configured to provide additional expansion to air flowing therethrough. An outlet conduit 268 may selectively direct the system airflow into the aircraft cabin through a cabin line 269 or to the ambient environment through an expulsion line 271. The outlet conduit 268 may include all or a portion of the outlet conduit 120. In some embodiments, a trim bypass line 270 may provide additional airflow to the outlet conduit 268 from the compressor outlet 231. The trim air in such embodiments may enter the outlet conduit 268 at a slightly elevated temperature from the air exiting the second cooling turbine 210. The balance of trim air to turbine air may be selected according to a desired airflow temperature inside the cabin.

As noted above, a motor-generator 212 is disposed on the primary shaft 214 in operable connection with the compressor 206 and power turbine 204. The electrical motor-generator 212 may be configured to alternately supply (i.e., generate) a motive force input to the primary shaft 214 and an electrical power output to the aircraft. As shown, the electrical motor-generator 212 is essentially coaxial with the power turbine 204, compressor 206, and cooling turbines 208, 210. In certain embodiments, the electrical motor-generator 212 may be axially positioned between the first cooling turbine 208 and the second cooling turbine 210. Advantageously, this positioning may allow the electrical motor-generator 212 to maintain a substantially lower operating temperature. In alternative embodiments, the electrical motor-generator 212 may be positioned forward or aft of the cooling turbines 208, 210 along the primary shaft 214.

One or more power storage device 272 (e.g., battery, capacitor, etc.) may be electrically connected to the electrical motor-generator 212. During use, an electrical current may be selectively transferred between the electrical motor-generator 212 and the power storage device 272. An exemplary embodiment of the electrical motor-generator 212 includes an electromagnetic winding (not shown) wrapped about the primary shaft 214. During use, an electrical current may be delivered to the electromagnetic winding, inducing a magnetic field that, in turn, generates a rotational motive force at the primary shaft 214. When a separate motive force (i.e., a motive force originating outside of the electrical motor-generator 212) is supplied to the primary shaft 214, a magnetic field radially inward from the winding may generate or induce an output electrical current through the electromagnetic winding. The current may be further transferred to the power storage device 272 as an electrical power output. Additionally or alternatively, the current may be transferred as an electrical power output to the aircraft engine 100. At the aircraft engine 100, the electrical power output may be utilized to motivate engine rotation and initiate operation of the engine 100 itself. Optionally, electrical communication between the electrical motor-generator 212 and the energy storage device, and/or between the electrical motor-generator 212 and the aircraft engine 100, may be regulated by the controller (see FIG. 1).

As noted above, the IPTMS 200, including the controller 201 may be configured to have multiple predefined operational modes. Exemplary operational modes may include one or more air-conditioning modes and one or more auxiliary power modes. Generally, the air-conditioning mode(s) will cool an airflow through the system before delivering it to the cabin, or another portion of the aircraft. Before entering the cabin, an air-conditioning mode serves to motivate the airflow through the compressor 206 and at least one of the first and second cooling turbines 208, 210, as described above.

The air-conditioning mode may include an in-flight air-conditioning mode and/or a parked air-conditioning mode. The in-flight air conditioning mode may be configured to cool and/or pressurize an airflow into the aircraft cabin while the aircraft engine 100 is operating (e.g., during flight), while the parked air conditioning mode may be configured to cool and/or pressurize an airflow into the aircraft cabin while the aircraft engine 100 is not operating (e.g., when the combustor 104 is not generating combustion exhaust gas).

In an exemplary embodiment of the in-flight air-conditioning mode, the airflow and rotational motivating force of the APU 202 is primarily supplied by the bleed air from the aircraft engine 100. For instance, a first airflow may be directed to the compressor 206 from the intermediate-pressure engine bleed line 238, thereby motivating the compressor 206 and primary shaft 214 to rotate. At least a portion of the first airflow exiting from the compressor 206 may be cooled as it is directed through the system 200, as described above, before exiting the second cooling turbine 210 into a cabin line 269 and/or cabin portion of the aircraft.

In an exemplary embodiment of the parked air-conditioning mode, an initial sequence is included. As part of the initial sequence, electrical power is directed from the power storage device 272 to the electrical motor-generator 212, thereby motivating a rotation of the primary shaft 214. Rotation may create a pressure difference across the compressor 206 and power turbine 204 to generate the first and second airflows, respectively. A combustion sequence may further be included, wherein the burner 224 is ignited and a combustion airflow or stream is added to the second airflow. The combustion sequence may continue to feed fuel to the burner 224, thereby maintaining rotation of the primary shaft 214 and simultaneously sustaining the first airflow and the second airflow.

The auxiliary power mode differs from the air-conditioning mode in that it serves to primarily generate or induce an electrical power output at the electrical motor-generator 212—at least for some moment in time. As the primary shaft 214 is rotates, an electrical power output may be induced at the electrical motor-generator 212, as described above. The auxiliary power mode may include one or more in-flight auxiliary power mode, a parked auxiliary power mode, and/or a starter power mode. Generally, the in-flight auxiliary power mode(s) may be configured to supply an electrical power output while the aircraft engine 100 is operating (e.g., during flight), while the parked auxiliary power mode and starter power mode may be configured to supply an electrical power output while the aircraft engine 100 is not operating (e.g., when the combustor 104 is not generating combustion exhaust gas).

In an exemplary first in-flight auxiliary power mode, the airflow and rotational motivating force of the APU 202 may be supplied at least partially by the bleed air from the aircraft engine 100. For instance, a first airflow may be directed to the compressor 206 from the high-pressure engine bleed line 218, thereby motivating the compressor 206 and primary shaft 214 to rotate. Rotation of the primary shaft 214 may induce an electrical power output from the electrical motor-generator 212, as described above.

In an additional or alternative exemplary second in-flight auxiliary power mode, the first airflow may be drawn into the compressor 206 from the ambient air line 234. At least a portion of the first airflow exiting from the compressor 206 may be directed through the first bypass line 236 as part of a second airflow, as described above. The mode may further include igniting the burner 224 in a combustion sequence and providing a combustion airflow or stream to the second airflow to rotationally motivate the power turbine 204. In such embodiments, rotation of the primary shaft 214 induces an electrical power output from the electrical motor-generator 212, as described above. Advantageously, such embodiments may provide electrical power to the aircraft without drawing a portion of the engine airflow away from the engine 100.

An exemplary parked auxiliary power mode may include an initial sequence and a combustion sequence similar to those described above. Specifically, the auxiliary power mode may include a parked initial sequence directing electrical power from the power storage device 272 to the electrical motor-generator 212, thereby motivating a rotation of the primary shaft 214. After the initial sequence, the combustion sequence may be included for igniting the burner 224 and providing a combustion airflow or stream to rotationally motivate the power turbine 204. The parked auxiliary power mode may further include inducing an electrical power output at the electrical motor-generator 212 and directing at least a portion of the electrical output power from the electrical motor-generator 212 to the energy storage device 272.

An exemplary starter power mode may be substantially the same as the parked auxiliary power mode embodiment described above. However, the starter power mode may include one or more additional sequences. For instance, the starter power mode may include temporarily directing an electrical power output from the electrical motor-generator 212 to the aircraft engine 100. Upon reaching the aircraft engine 100, the electrical output power may initiate (i.e., start) operation of the engine 100 via a suitable starter mechanism.

It is envisioned that the above-described air-conditioning and auxiliary power modes are non-exclusive. Additional or alternative modes may be provided. One or more operational modes may also be combined to additionally or alternatively cool an airflow to the cabin line 269 while supplying a power output to another portion of the aircraft.

Figure 3:
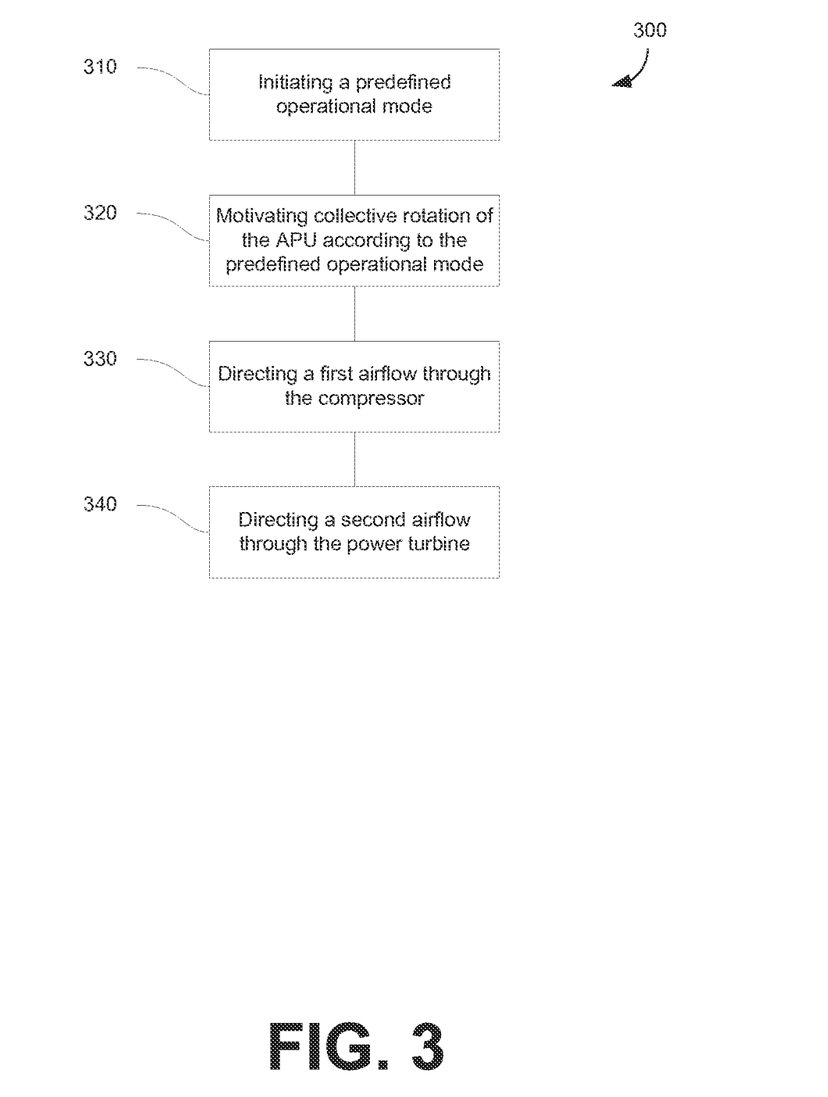
FIG. 3 provides an exemplary embodiment of a method of using an integrated thermal management system according to the present disclosure.

Turning to FIG. 3, a method for operating an integrated power and thermal management system according to an exemplary embodiment of the present disclosure is provided. As shown, the method may include the step 310 of initiating an operational mode for the system. The mode may be selected from one or more operational mode options. For instance, an operational mode may be chosen from one or more of the above described air-conditioning mode(s), auxiliary power mode(s), or combinations thereof.

Further included in the method 300 is the step 320 of motivating collective rotation of a power turbine 204, compressor 206, first cooling turbine 208, second cooling turbine 210, and motor-generator about a primary shaft 214 according to the predefined operational mode. As shown, the method also includes the step 330 of directing a first airflow through the compressor 206, and step 340 of motivating a second airflow through the power turbine 204.

In some embodiments, the predefined operational mode includes an air-conditioning mode wherein the method 300 further includes directing at least a portion of the first airflow from the compressor 206 through the reheater loop 240, thereby cooling the portion of the first airflow. The air-conditioning mode may also include directing the portion of the first airflow through at least one of the first cooling turbine 208 or the second cooling turbine 210 before the first airflow is directed into a cabin line 269 and cabin portion of the aircraft. Optionally, the air-conditioning mode is a parked air-conditioning mode further including permitting electrical power to pass from a power storage device 272 to the electrical motor-generator 212, igniting the burner 224 upstream of the power turbine 204, and directing a combustion airflow through the power turbine 204. Upon the power turbine 204 reaching a predetermined rotational speed or motivational torque, electrical power and current may be restricted between the electrical motor-generator 212 and the power storage device 272. The air-conditioning mode may further include one or more of the steps recited above.

In additional or alternative embodiments, the predefined operational mode includes an auxiliary power mode, facilitating an electrical power output at the electrical motor-generator 212. Moreover, the electrical power output may be selectively transferred to the engine 100 and/or to the power storage device 272. As described above, the electrical power output at the engine 100 may subsequently generate a motive force input to an engine shaft and/or supply additional electrical power to the aircraft (e.g., as an electrical power source for one or more electronic accessory in the aircraft). As described above, the electrical power output may be induced through the electrical motor-generator 212 as the primary shaft 214 rotates therein. An initial sequence of the electrical motor-generator 212 or bleed air directed to the compressor 206 may be provided during the initiation of collective rotation (e.g., step 320). The auxiliary power mode may include a parked auxiliary mode including directing a portion of the first airflow from the compressor 206 to the power turbine 204 and the second airflow. In such embodiments, the parked auxiliary mode may further include igniting the burner 224 upstream of the power turbine 204, and directing a combustion airflow through the power turbine 204. The auxiliary power mode may additionally include one or more of the steps recited above.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An integrated power and thermal management system for a turbine-powered aircraft, the system comprising:
   a power turbine rotatably disposed on a primary shaft;
   a compressor rotatably disposed on the primary shaft to motivate a system airflow, the compressor being operably joined to the power turbine;
   a first cooling turbine rotatably disposed on the primary shaft in selective fluid communication with the compressor;
   a second cooling turbine rotatably disposed on the primary shaft in selective fluid communication with the first cooling turbine; and
   an electrical motor-generator disposed on the primary shaft to alternatively supply a motive force input to the primary shaft and an electrical power output to the aircraft.

2. The integrated power and thermal management system of claim 1, wherein the electrical motor-generator is axially positioned on the primary shaft between the compressor and the second cooling turbine.

3. The integrated power and thermal management system of claim 1, further comprising a burner in fluid communication with the power turbine and positioned upstream of an inlet of the power turbine.

4. The integrated power and thermal management system of claim 1, further comprising an engine bleed line in fluid communication with the compressor to direct air from a portion of a gas turbine engine and into the compressor.

5. The integrated power and thermal management system of claim 1, further comprising a first cooling circuit directing at least a portion of the system airflow between the compressor and the first cooling turbine, the first cooling circuit including a reheater loop to simultaneously exchange heat between an upstream portion of the system airflow and a downstream portion of the system airflow.

6. The integrated power and thermal management system of claim 5, wherein the reheater loop includes a reheater unit including
   an upstream inlet and a discrete downstream inlet, and
   an upstream outlet and a discrete downstream outlet, wherein the upstream inlet is positioned in fluid flow before the downstream inlet to direct air thereto.

7. The integrated power and thermal management system of claim 6, wherein the reheater loop includes a condenser having
   a first-pass inlet and first-pass outlet positioned in fluid communication between the upstream outlet and downstream inlet of the reheater unit, and
   a second-pass inlet and second-pass outlet in fluid communication between the first cooling turbine and the second cooling turbine.

8. The integrated power and thermal management system of claim 1, wherein the second cooling turbine includes an outlet conduit to direct at least a portion of the system airflow into a cabin portion of the aircraft.

9. The integrated power and thermal management system of claim 1, further comprising a power storage device electrically connected to the electrical motor-generator and configured to selectively receive and transmit an electrical power signal thereto.

10. An integrated power and thermal management system for a turbine-powered aircraft, the system comprising:
- a power turbine rotatably disposed on a primary shaft;
- a compressor rotatably disposed on the primary shaft to motivate a system airflow, the compressor being operably joined to the power turbine;
- a first cooling turbine rotatably disposed on the primary shaft in selective fluid communication with the compressor;
- a second cooling turbine rotatably disposed on the primary shaft in selective fluid communication with the first cooling turbine;
- an electrical motor-generator disposed on the primary shaft to alternatively supply a motive force input to the primary shaft and an electrical power output to the aircraft; and
- a controller in operable communication with the electrical motor-generator and configured to control the system according to one or more predefined modes.

11. The integrated power and thermal management system of claim 10, further comprising an engine bleed line in fluid communication with the compressor to direct air from a portion of a gas turbine engine and into the compressor, and wherein the predefined mode includes an air-conditioning mode motivating an airflow through the compressor and at least one of the first and second cooling turbines before entering a cabin portion of the aircraft.

12. The integrated power and thermal management system of claim 10, further comprising a power storage device electrically connected to the electrical motor-generator, and wherein the predefined mode includes an auxiliary power mode having an initial sequence directing electrical power from the power storage device to the electrical motor-generator, motivating a rotation of the primary shaft.

13. The integrated power and thermal management system of claim 12, further comprising a burner in fluid communication with the power turbine and positioned upstream of an inlet of the power turbine, and wherein the auxiliary power mode includes igniting the burner and providing a combustion airflow to rotationally motivate the power turbine.

14. The integrated power and thermal management system of claim 13, wherein the auxiliary mode includes inducing an electrical power output at the electrical motor-generator and directing at least a portion of the electrical output power from the electrical motor-generator to a gas turbine engine of the aircraft to initiate operation of the gas turbine engine.

15. The integrated power and thermal management system of claim 13, further comprising a bypass line in fluid communication between an outlet of the compressor and the power turbine to selectively direct air from the compressor to the burner and power turbine.

16. A method for operating an integrated power and thermal management system for a turbine-powered aircraft, the method comprising the steps of:
- initiating an operational mode for the system;
- motivating collective rotation of a power turbine, a compressor, a first cooling turbine, a second cooling turbine, and a motor-generator about a primary shaft, according to the predefined operational mode;
- directing a first airflow through the compressor; and
- directing a second airflow through the power turbine.

17. The method of claim 16, wherein the predefined operational mode includes an air-conditioning mode, directing at least a portion of the first airflow from the compressor through a reheater loop and to the first cooling turbine, thereby cooling the portion of the first airflow, and
- further directing at least a portion of the portion of the first airflow through at least one of the first cooling turbine or the second cooling turbine before the first airflow is directed into a cabin portion of the aircraft.

18. The method of claim 17, wherein the air-conditioning mode includes a parked air-conditioning mode, including
- permitting electrical power to pass from a power storage device to the electrical motor-generator and induce a rotational electrical current at the electrical motor-generator,
- igniting a burner positioned upstream of the power turbine to create a combustion airflow, and
- directing at least a portion of the combustion airflow through the power turbine with the second airflow.

19. The method of claim 16, wherein the predefined operational mode includes an auxiliary power mode, including facilitating an electrical output power at the electrical motor-generator.

20. The method of claim 19, wherein the auxiliary power mode further includes a parked auxiliary mode, including
- directing a portion of the first airflow from the compressor to the power turbine and the second airflow, and
- igniting a burner positioned upstream of the power turbine to create a combustion airflow, and
- directing at least a portion of the combustion airflow to pass through the power turbine with the second airflow.

* * * * *

UNITED STATES PATENT AND TRADEMARK OFFICE
CERTIFICATE OF CORRECTION

PATENT NO. : 9,534,538 B1
APPLICATION NO. : 14/923731
DATED : January 3, 2017
INVENTOR(S) : Cerny It is certified that error appears in the above-identified patent and that said Letters Patent is hereby corrected as shown below:

On the Title Page

Item (56), under "U.S. PATENT DOCUMENTS", in Column 2, Line 4, delete "Glickstein" and insert -- Glickstein et al. --, therefor.

Item (56), under "U.S. PATENT DOCUMENTS", in Column 2, Line 11, delete "Wilmot, Jr." and insert -- Wilmot, Jr., et al. --, therefor.

Item (56), under "U.S. PATENT DOCUMENTS", in Column 2, Line 13, delete "Lui" and insert -- Lui et al. --, therefor.

Item (56), under "U.S. PATENT DOCUMENTS", in Column 2, Line 15, delete "Sabatino" and insert -- Sabatino et al. --, therefor.

On Page 2, Item (56), under "U.S. PATENT DOCUMENTS", in Column 1, Line 1, delete "Coffinberry" and insert -- Coffinberry et al. --, therefor.

In the Specification

In Column 3, Line 42, delete "combustor 102" and insert -- combustor 104 --, therefor.

In Column 4, Line 61, delete "ambient air line 118." and insert -- ambient air line 234. --, therefor.

In Column 7, Lines 47-48, delete "intermediate-pressure engine bleed line 238," and insert -- intermediate-pressure engine bleed line 228, --, therefor.

In Column 8, Line 5, delete "is rotates," and insert -- rotates, --, therefor.

Signed and Sealed this
Seventh Day of March, 2017

Michelle K. Lee
*Director of the United States Patent and Trademark Office*

CERTIFICATE OF CORRECTION (continued)
U.S. Pat. No. 9,534,538 B1

In the Claims

In Column 10, Line 61, in Claim 7, delete "outlet" and insert -- outlet positioned --, therefor.